US012274662B2

(12) United States Patent
Orrell-Jones et al.

(10) Patent No.: US 12,274,662 B2
(45) Date of Patent: Apr. 15, 2025

(54) ROBOTIC ROLLATOR WALKER WITH AUTOMATED POWER DRIVE

(71) Applicants: Duncan Anthony Orrell-Jones, Manhattan Beach, CA (US); Amir Hajiloo, Long Beach, CA (US); Matthew John Sampson, Lomita, CA (US)

(72) Inventors: Duncan Anthony Orrell-Jones, Manhattan Beach, CA (US); Amir Hajiloo, Long Beach, CA (US); Matthew John Sampson, Lomita, CA (US)

(73) Assignee: CAMINO ROBOTICS, INC., Torrance, CA (US)

( * ) Notice: Subject to any disclaimer, the term of this patent is extended or adjusted under 35 U.S.C. 154(b) by 548 days.

(21) Appl. No.: 17/403,623

(22) Filed: Aug. 16, 2021

(65) Prior Publication Data

US 2022/0110818 A1 Apr. 14, 2022

Related U.S. Application Data

(60) Provisional application No. 63/065,959, filed on Aug. 14, 2020.

(51) Int. Cl.
*A61H 3/04* (2006.01)

(52) U.S. Cl.
CPC ......... *A61H 3/04* (2013.01); *A61H 2003/043* (2013.01)

(58) Field of Classification Search
CPC ................ A61H 3/04; A61H 2003/043; A61H 2201/5061; A61H 2201/5069;
(Continued)

(56) References Cited

U.S. PATENT DOCUMENTS 8,380,379 B2 * 2/2013 Song ........................ B60L 15/20 180/19.2
10,733,866 B2 * 8/2020 Rabinowitz .............. A61H 3/02
(Continued)

FOREIGN PATENT DOCUMENTS

JP 2012066783 A * 4/2012
WO WO-2018207095 A1 * 11/2018
WO WO-2022036327 A1 * 2/2022 ............... A61H 3/04

OTHER PUBLICATIONS

Translation of JP2012066783A accessed on Sep. 10, 2023 at www.espacenet.com (Year: 2012).*
(Continued)

*Primary Examiner* — James A Shriver, II
*Assistant Examiner* — Hilary L Johns
(74) *Attorney, Agent, or Firm* — Andrew S. Naglestad

(57) ABSTRACT

A walker with an automated power drive system is disclosed. The walker comprises a rigid frame comprising a left grip and a right grip; a plurality of wheels affixed to the rigid frame; a plurality of drive motors integrally mounted in the plurality of wheels; and a drive motor controller configured to power the plurality of drive motors. The drive motor controller is configured to: determine the orientation of the walker; generate a first motor current component to compensate for orientation of the walker and the resulting torque on the drive motor; determine the speed of the walker; generate a second motor current to component for internal friction based on the speed of the walker; determine a user force applied to the left grip and right grip; generate a third motor current component for the drive motors based on the user force applied to the left grip and right grip; and power the drive motors based on a sum of the first motor current component, second motor current component, and third motor current component. The drive motor controller is configured to determine the user force applied to the left grip
(Continued)

and right grip based on a measured current from the drive motors. Specifically, the drive motor controller is configured to determine the user force applied to the left grip and right grip based on a difference between a target current provided to the drive motors and the actual current utilized by the drive motors.

8 Claims, 6 Drawing Sheets

(58) Field of Classification Search
CPC .... A61H 2201/0176; A61H 2201/0173; A61H 2201/5064; A61G 5/04; A61G 2200/36; A61G 2203/34; B62B 5/0043; B62B 5/0073
USPC .......................................................... 280/87.041
See application file for complete search history.

(56) References Cited

U.S. PATENT DOCUMENTS

2011/0282529 A1* 11/2011 Song ........................ B60L 15/20
701/22
2014/0345956 A1* 11/2014 Kojina .................. B62B 5/0073
180/19.1
2015/0066277 A1* 3/2015 Kojina .................. B62B 5/0033
180/19.1
2016/0253890 A1* 9/2016 Rabinowitz ............ A61B 5/225
340/539.13
2020/0008990 A1* 1/2020 Harrison ................ B62K 5/025

OTHER PUBLICATIONS

Translation of WO2018207095A1 accessed on Sep. 11, 2023 at www.espacenet.com (Year: 2018).*

* cited by examiner

ROBOTIC ROLLATOR WALKER WITH AUTOMATED POWER DRIVE

CROSS-REFERENCE TO RELATED APPLICATION(S)

This application claims the benefit of U.S. Provisional Patent Application Ser. No. 63/065,959 filed Aug. 14, 2020, titled "Robotic rollator walker with automated power drive, automated braking, power actuated articulation and remote health monitoring," which is hereby incorporated by reference herein for all purposes.

TECHNICAL FIELD

This invention generally relates to a walker configured to assist people to walk. In particular, the invention relates to a walker system and method for automated power assist and braking based on perceiving the intent of the user, the user's environment, as well as interaction with the user.

BACKGROUND

As the population grows older, there is an increased need for devices to assist the elderly and mobility-impaired to stay active and maintain as much autonomy as possible. Walkers, for example, are used to assist the elderly to safely maneuver around their homes, neighborhoods, and business. These walkers, including devise commonly referred to as "rollators", are manual devices that must be physically pushed and turned by the user. That is, the user must physically roll the walker forward or, in some cases, lift the walker up and forward in order to advance forward. Staying active and mobile is an important element of staying physically and mentally healthy, but maneuvering and manipulating a walker makes this difficult in many situations. Using a walker adds to the physical challenge of going uphill or maneuvering over rough surfaces: the user must push the walker up the hill in addition to their own weight. Walking downhill requires the user to manually squeeze brake levers to ensure that the walker doesn't roll away. a walker requires adds strength and stamina. There is therefore a need for a walker device that can assist the user while reducing the burden and physical demands of using a walker for support.

SUMMARY

The invention is a powered rollator walker for assisting an elderly person or mobility-impaired person to walk. In the preferred embodiment, the wheel system is self-powered and is configured to determine the user's desired speed and direction, provide variable power assist and automatic braking in response to changes in slope or surface friction. In an alternate embodiment, the walker also has powered folding elements to enable the walker to articulate into various states on command.

The invention in the preferred embodiment features a walker with an automated power drive. The walker comprises a rigid frame comprising a left grip and a right grip; a plurality of wheels affixed to the rigid frame; a plurality of drive motors integrally mounted in the plurality of wheels; and a drive motor controller configured to power the plurality of drive motors. The drive motor controller is configured to: determine the orientation of the walker; generate a first motor current component to compensate for orientation of the walker and the resulting torque on the drive motor; determine the speed of the walker; generate a second motor current to component for internal friction based on the speed of the walker; determine a user force applied to the left grip and right grip; generate a third motor current component for the drive motors based on the user force applied to the left grip and right grip; and power the drive motors based on a sum of the first motor current component, second motor current component, and third motor current component.

In some embodiments, the drive motor controller is configured to determine the user force applied to the left grip and right grip based on a measured current from the drive motors. Specifically, the drive motor controller is configured to determine the user force applied to the left grip and right grip based on a difference between a target current provided to the drive motors and the measured current from the drive motors.

In some other embodiments, the walker further includes a remote health monitor configured to acquire one or more metrics characterizing the user's gait, the user's heart rate, the user's blood oxygen level, etc. in real time. These health parameters can then be transmitted to a remote server for analysis by medical personnel.

In another preferred embodiment, the walker comprises a drive motor configured to: determine an orientation of the walker and a speed of the walker, generate a first motor current component based on the orientation of the walker; generate a second motor current component based on the speed of the walker; generate a third motor current component for the left drive motor and another for the right drive motor; power the left drive motor with a drive current equal to a sum of the first motor current component, second motor current component, and third motor current component associated with the left drive motor, and power the right drive motor with a drive current equal to a sum of the first motor current component, second motor current component, and third motor current component associated with the right drive motor. In this embodiment, the third motor current component associated with the left drive motor is steadily increased over a predetermined period of time until a user force is detected at the left drive motor, and the third motor current component associated with the right drive motor steadily increased over a predetermined period of time until a user force is detected at the right drive motor.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

Figure 1:
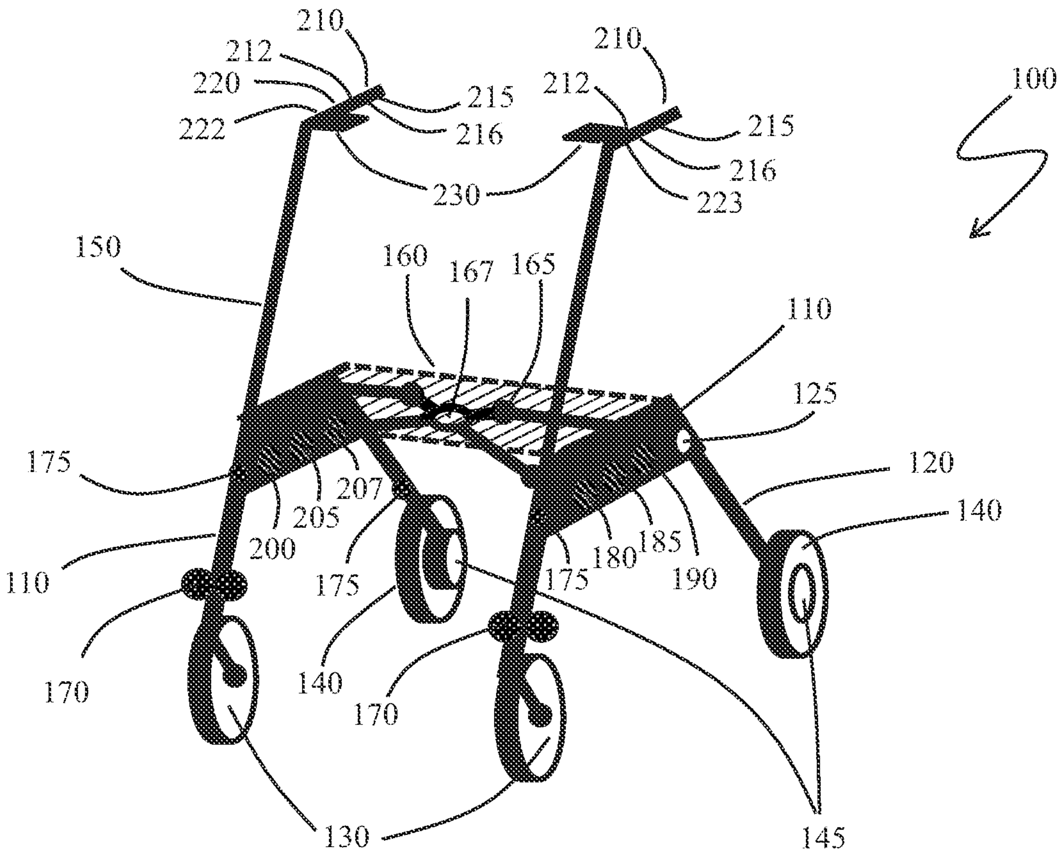
FIG. 1 is perspective view of the automatic walker, in accordance with a first embodiment of the present invention.

As illustrated in perspective view in FIG. 1, the rollator walker 100 includes rigid frame side structures 110, foldable rear legs 120, with actuators for powered folding 125, two steerable front wheels with integrated casters 130, two rear wheels 140 with integrated drive motors 145, powered telescoping handle shafts 150, a folding or flexible seat 160 above a power-actuated linkage mechanism for side-to-side folding 165, with an integrated lockout mechanism for variable width settings 167, at least one laser or similar object proximity sensor 170, at least one image capturing sensor 175, a central processing unit 180, a global positioning satellite (GPS) module 185, a voice or natural language processing module 190, an inertial measurement unit (IMU) 200, wireless communication module that can communicate to Bluetooth devices and/or to remote servers via various wireless data networks and protocols 205, an image processor 207, two handle grips 210 with one or both incorporating haptic feedback motors 212, touch sensors 215, grip force sensors 216, a heart rate and pulse-oxygen sensor 220, a blood pressure sensor 222, a body temperature sensor 223, and a user interface for selecting modes 230.

Figure 2:
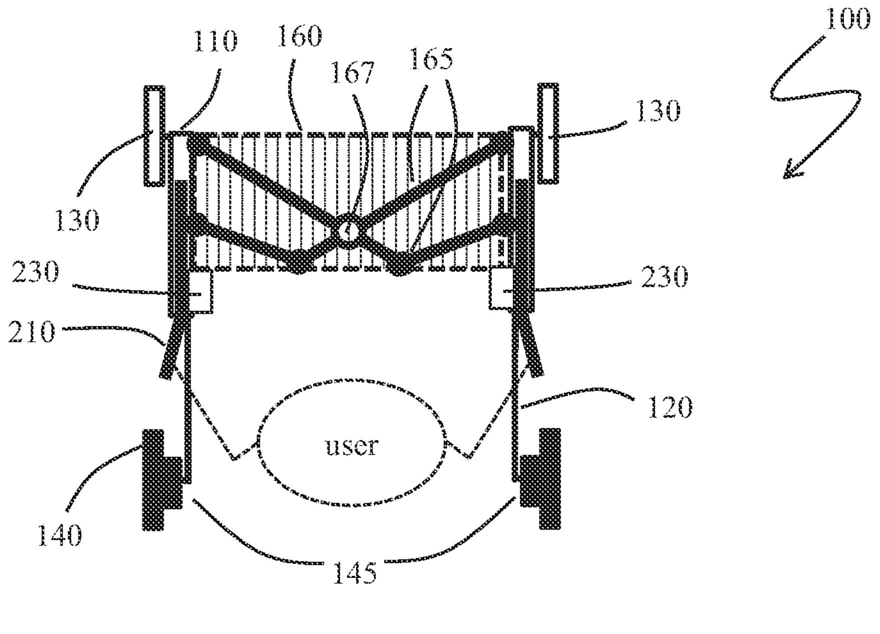
FIG. 2 is a top view of the automatic walker, in accordance with a first embodiment of the present invention.

As illustrated in top view in FIG. 2, the frame 100 includes rigid frame side structures 110, foldable rear legs 120, two steerable front wheels 130, two rear wheels 140 with integrated drive motors 145, two handle grips 210 with one or more user interfaces for controlling modes of the walker 230, and a folding or flexible seat 160 above a power-actuated linkage mechanism for side-to-side folding 165, with an integrated lockout mechanism for variable width settings 167. The user stands behind the seat 160 and midway between the foldable rear legs 120. The user can hold onto the handle grips 210.

Figure 3:
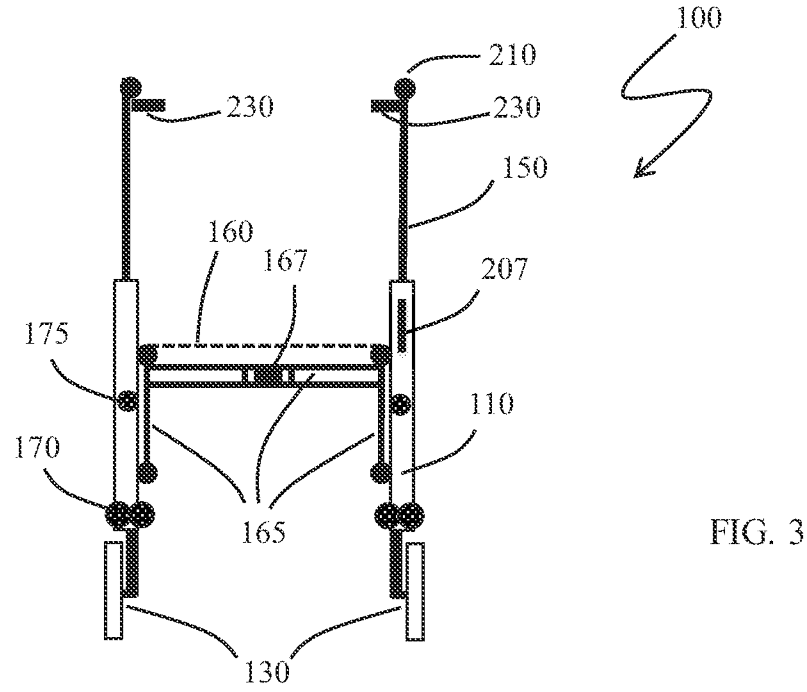
FIG. 3 is a front view of the automatic walker when partially folded, in accordance with a first embodiment of the present invention.
Figure 4:
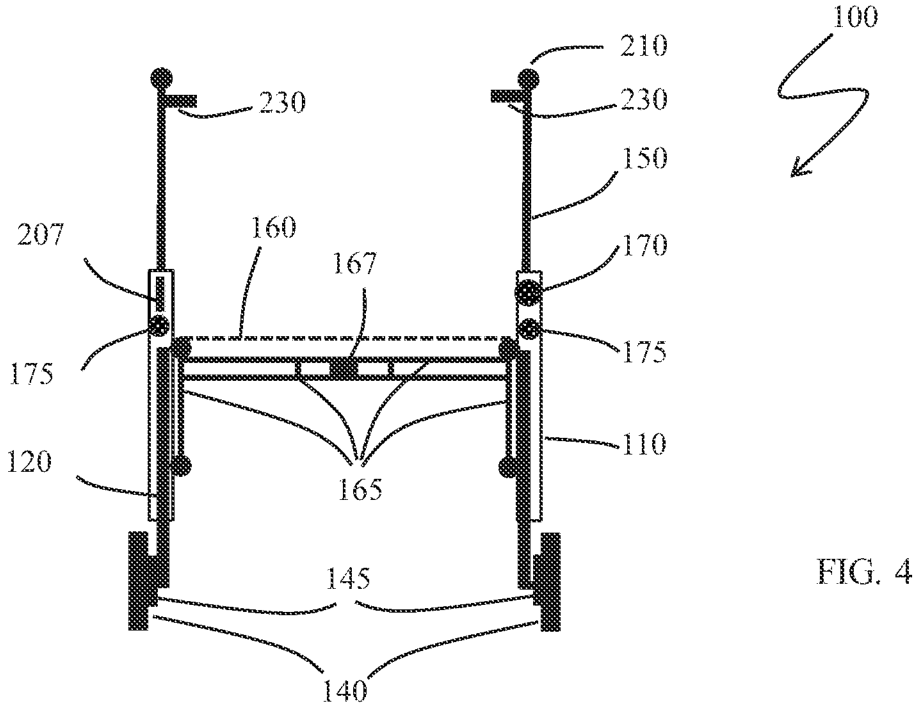
FIG. 4 is a rear view of the automatic walker, in accordance with a first embodiment of the present invention.

As illustrated in partially folded front view in FIG. 3, the frame 100 includes a foldable or flexible seat above power-actuated linkage mechanism for side-to-side folding 165, with an integrated lockout mechanism for variable width settings 167, which can be controlled either by the handle-mounted user interface 230, or though the integrated voice or natural language processing module 190.

As illustrated in fully open rear view in FIG. 3, the frame 100 includes one or more image capturing sensors that are mounted facing towards the user 175 to in order to capture images of the user. The images are analyzed by the central processing unit for the purposes of measuring and tracking the kinematics of the user's walking gait.

As illustrated in the fully open rear view in FIG. 3, the rigid side frame includes one or more proximity sensors 170 that are oriented towards the user to actively measure the distance between the user and the frame at various places on the user's body. The data from the proximity sensors is analyzed by the central processing unit to evaluate the user's posture and to determine if there are any unusual or dangerous changes in the distance between the user and the frame.

In the preferred embodiment, the integrated rear wheel motors 145 are configured to automatically sense and measure the user's desired speed and direction without the need for any additional sensors or user inputs. Various parameters of each rear wheel motor 145 (motor current, applied torque, rotational velocity and rotational acceleration) are analyzed by the central processing unit as they are influenced by the user's actions, and the central processing unit is programmed to automatically adjusts the torque and speed of each rear wheel motors 145 to change both the speed and trajectory of the walker based on the force that the user exerts on each handle grip 210. The rear wheel motors 145 can be powered independently in either direction (forwards of backwards) in response to the direction that the user is moving their hands on each grip. For example, if while gripping the right grip, the user's right hand moves backwards, the central processing unit 180 will automatically cause the right wheel to turn backwards.

In the preferred embodiment, the central processing unit 180 continuously monitors the parameters of the rear power wheel motors 145, the proximity sensors 170, the image capturing sensors 175, the capacitive sensors in the handles 215, the grips force sensors 216, and the inertial measurement unit 200 and analyzes this inputs to determine how to adjust the speed and the torque of each power rear wheel motors 145 to ensure that the walker moves in the direction the user desires and at exactly the speed the user desires with minimal change in the amount of force the user exerts on the walker even when used on hills slopes and on a variety of surfaces with different levels of friction.

In the preferred embodiment, the inertial measurement unit 200 can detect when the walker is not on flat ground and can determine the angle and grade of the slope. Changes in angle and gradient of the terrain are analyzed by the central processing unit 180 which automatically adjusts the torque and speed of each rear wheel motor 145 so that the device moves at the speed and trajectory that the user desires even when moving up, down or across slopes.

In the preferred embodiment, the inertial measurement unit 200 can detect accelerations and decelerations of the walker. The central processing unit 180 analyzes acceleration and decelerations and automatically slows or stops the rotation of the rear wheel motors 145 to prevent the walker from moving away from the user before the user can apply manual brakes.

In the preferred embodiment, the proximity sensors 170 and/or image capturing sensors 175 on the front and sides of the walker 170 are configured to both detect various hazards in front of or to the side of the walker such as objects, steps, curbs, dips, people or animals, and determine the position of the hazard relative to the trajectory of the walker. The central processing unit 180 analyzes these data and can instruct the rear power wheel motors to slow, stop or change the trajectory of the walker to help the user avoid the hazard.

In another embodiment, the power telescoping handle shafts 150, the rear legs 120 with power folding actuators 125, and the power actuated linkage mechanism for side-to-side folding 160 can be instructed to articulate the walker into various configurations to help the user with activities of daily living, either through manual interactions with the handle mounted user interface 230, or thought vocal commands detected by the voice or natural language processing module 190. These configurations include adjusting the width of the walker while walking, changing the height of the handles, changing the angle of the foldable rear legs 120, fully folding the walker into a compact configuration for transportation or storage, and fully unfolding the walker for normal use.

In the preferred embodiment, the touch sensor(s) 215 and grip force sensors 216 integrated into the handle grips can sense if and how the user is grasping each grip and the central processing unit 180 analyzes these inputs to determines whether certain powered actions of the walker should, should not, can, or cannot be performed. If the user removes both hands from the grips, the central processing unit 180 causes the power rear wheels 140 to prevent the wheels from turning so the walker does not roll away, even if the walker is on a slope. The central processing unit 180 would not allow the walker to fold autonomously if the user is gripping either of the handles.

In the preferred embodiment, the haptic motors 212 integrated into the handle grips 210 can vibrate with various patterns to give the user warnings based on detected hazards or can give the user feedback or instructions.

In another embodiment, cameras or other image capturing sensors 175 and/or proximity sensors 170, are mounted on the walker in positions so as to track the location of, and full range of motion of the user's legs, from hips to toes throughout the full walking cycles, and these images are processed by the image processor 207 to measure and track the user's walking gait, including the location of the user's hips, thighs, knees, lower legs, heels and toes in space relative to the position of the walker. The image processor 207 converts the captured images into simplified data representations of the user's lower body motions and can wirelessly communicate this data to cloud servers either in a stream or on batches via the wireless communication module 205.

In the preferred embodiment, the central processing unit 180 continuously monitors a range of data from the powered and electrical components of the walker, including diagnostic data on the performance of the powered and electrical components, as well as data related to the user's actions and uses of the walker, and communicates this data via the wireless communications module 205 to cloud servers.

In another embodiment, data from the inertial measurement unit 200 and the global positioning module 185 can be used to determine if the user may have fallen, or if the walker is not working, and can use the wireless communication module 205 to beacon an automated alert message with the walker status and location to family members, caregivers or to emergency services via the cloud servers.

In another embodiment, physiological data from the grip force sensors 216, heart rate and pulse-oxygen sensor 220, blood pressure sensor 222, and body temperature sensor 223 are analyzed along with slope and acceleration data from the IMU 200, user walking speed data from the rear wheel motors 145, and walking gait data from the image capturing sensors 175 and image processing unit 207 to identify potential health risks for the user, or diagnose potential chronic and acute health conditions of the user.

Illustrated in FIGS. 5-8, the second preferred embodiment of the rollator walker 500 includes rigid frame side structures 550, foldable rear legs 552, two steerable front wheels with integrated casters 554, two rear wheels 522 with integrated drive motors (brushless DC motors with step-down gearing) and brakes 524, powered telescoping handle shafts 556 with two handle grips incorporating capacitive touch sensors 510 and haptic motors 512, a folding seat 526 with an integrated, power-actuated mechanism for side-to-side folding, and a battery 530.

The rollator walker 500 further includes at least one main micro-control unit (MCU) 514 with a global positioning satellite (GPS) module, inertial measurement unit (IMU), Haptic motor driver, wireless communication module that can communicate with BLUETOOTH™ devices and/or to remote servers via various wireless data networks and protocols, a BLE chip, a UART communication module, a camera microcontroller unit 516 coupled to rear-facing cameras 520 and forward-facing cameras 720, position sensors 518, and a user interface for selecting power modes.

Figure 5:
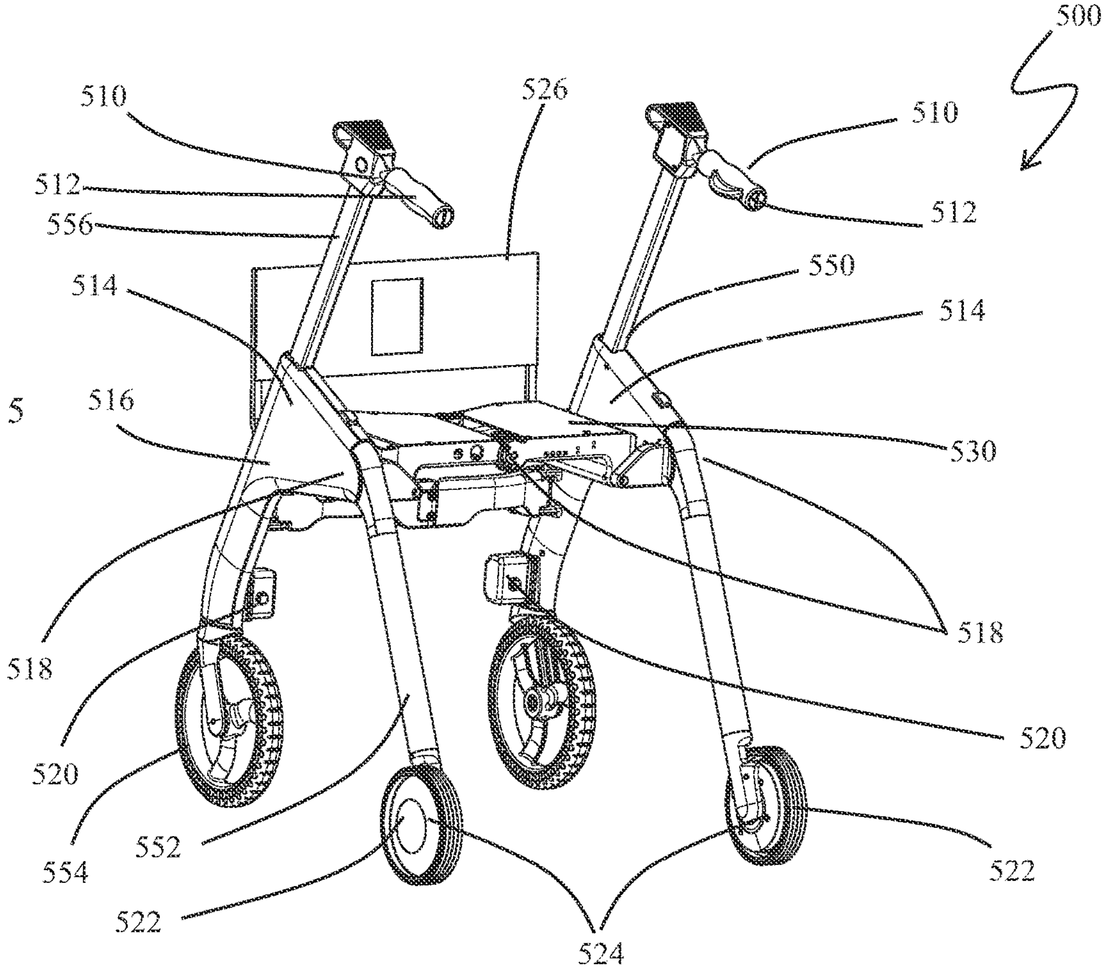
FIG. 5 is a perspective of the automatic walker, in accordance with a second embodiment of the present invention.
Figure 6:
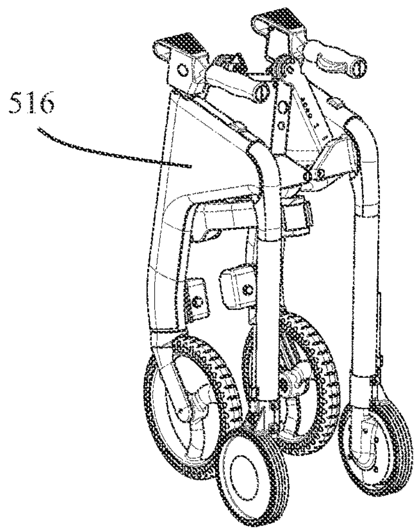
FIG. 6 is a perspective of the automatic walker when partially folded, in accordance with a second embodiment of the present invention.
Figure 7:
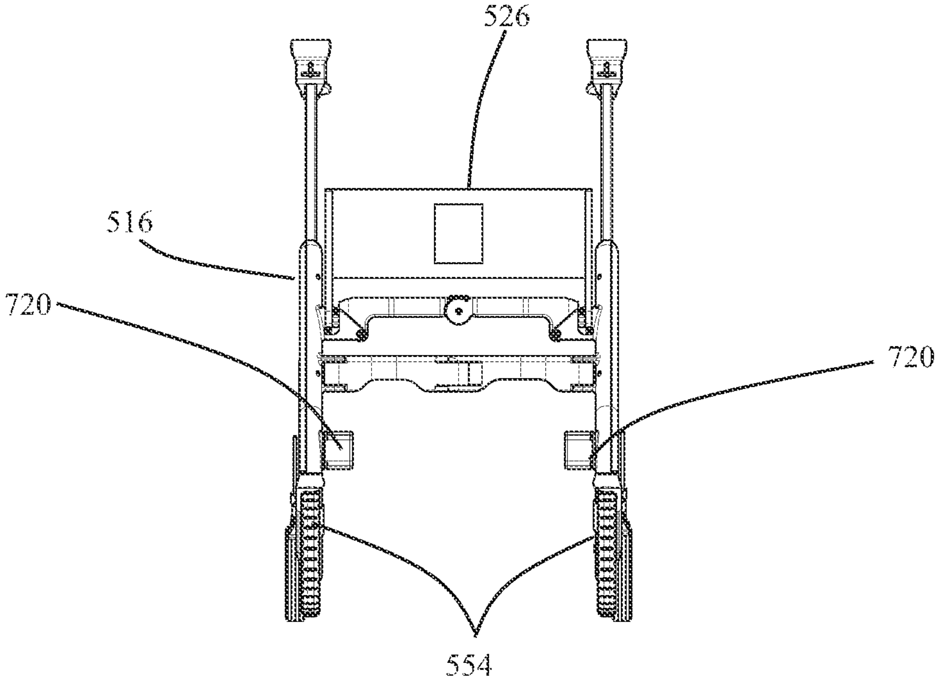
FIG. 7 is a front of the automatic walker, in accordance with a second embodiment of the present invention.
Figure 8:
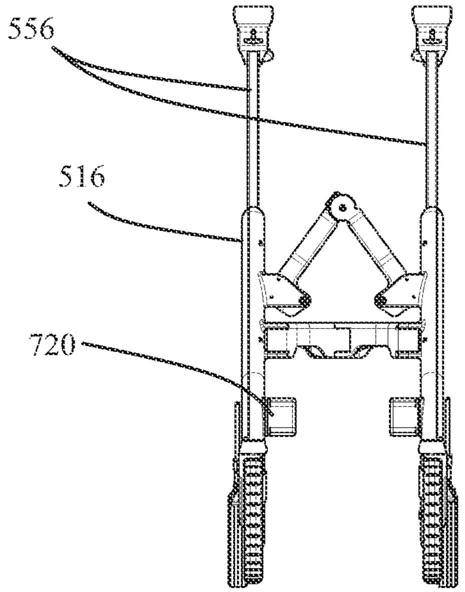
FIG. 8 is a front of the automatic walker in the narrow mode, in accordance with a second embodiment of the present invention.

The position sensors 518 are switches that indicate whether the walking is in a folded configuration as shown in FIG. 6, or in an open as shown in FIG. 5. In the folded configuration, the rear legs are stowed, and the left and right sides moved inward to narrow the walker. The position sensors 518 are configured to activate the parking brake for the rear wheels when the walker is initially unfolded.

The capacitive touch sensors 510 integrated into the handle grips can sense if the user is grasping each grip. If the user removes both hands from the grips, the MCU 514 prevents the wheels from turning so the walker does not roll away, even if the walker is on a slope. If the user, however, has one hand on either handle grips, the touch sensors 510 detect the presence of the user and may thereafter execute autonomous movement, as described in more detail below.

The rollator walker 500 further includes haptic motors 512 in the grips integrated into the handle grips. The haptic motors 512 are configured to provide vibratory feedback in the form of a hazard warning as well as therapeutic feedback. For example, the haptic motors 512 are configured to vibrate at a determined interval to serve as a metronome indicating the pace at which the user should walk.

The MCU 514 is the central computer for the power wheel control systems and other electrical systems including lights, sensors, etc. The MCU 514 further includes an inertial measurement unit (IMU) configured to determine the orientation (roll and pitch) of the walker 500, and the acceleration of the walker along three axes. When powered on, for example, the IMU determines whether or not the walker is on level ground, and the direction and grade of the slope if not. That is, the IMU is configured to determine if the walker is angled downward in the forward direction, to one side, to the back, or any angle therebetween. The orientation of the walker is transmitted to the MCU 514 and factored into an algorithm during automatic drive mode described in more detail below.

Figure 9:
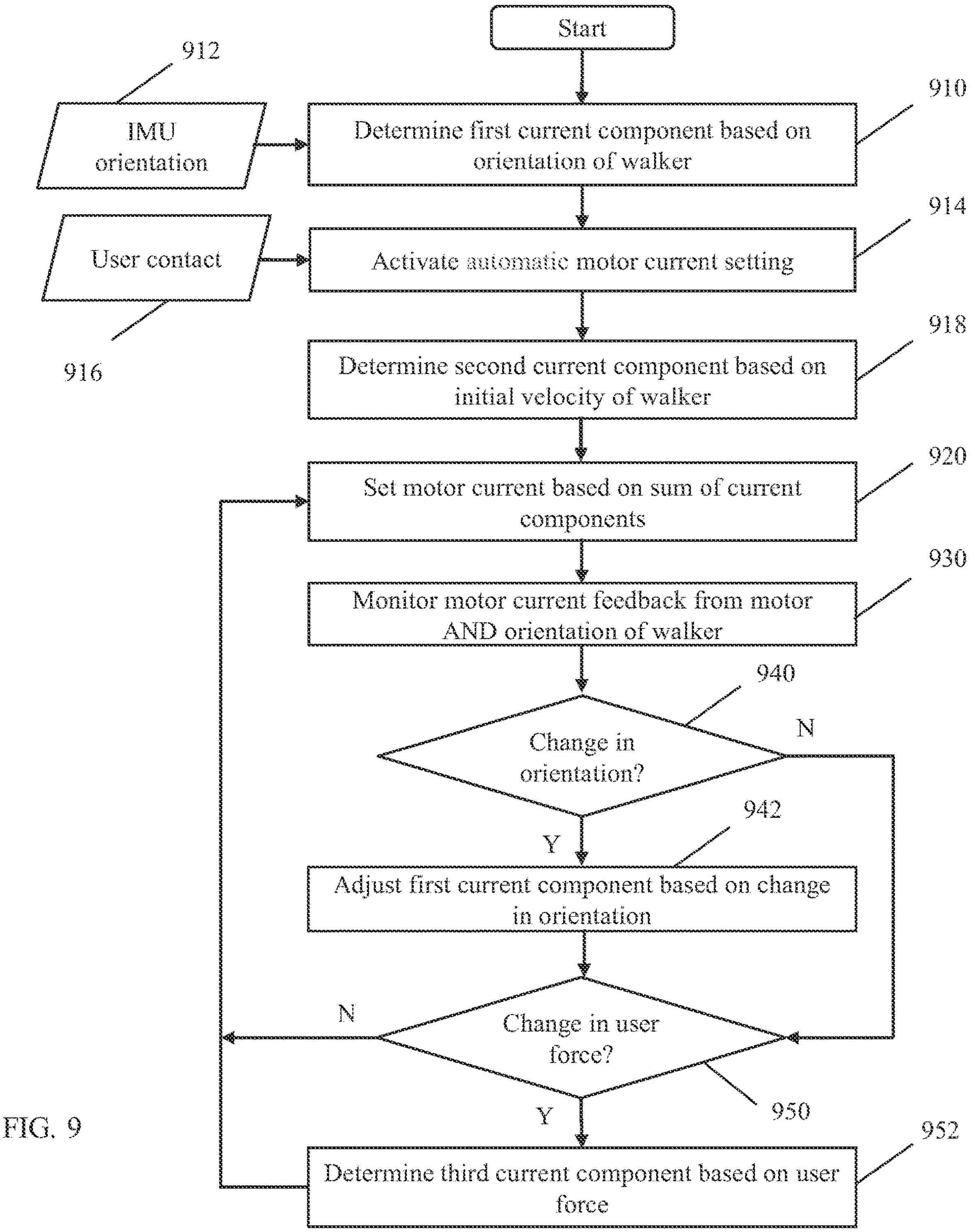
FIG. 9 is a flow chart of the process of generating motor current for a drive motor, in accordance with a first embodiment of the present invention.

Illustrated in FIG. 9 is a flow chart of the process of generating motor current for a drive motor in a pair of wheels, preferably the rear wheels 522, in accordance with a first embodiment of the present invention. This process pertains to the control of a single motor. Since the walker consists of at least two drive motors, one instance of this process is used to control the drive motor in a left rear wheel and a separate instance of the process used to control the drive motor in a right rear wheel. The process is therefore executed for two wheels in parallel and independently of one another.

Referring to FIG. 9, the user starts the process by powering on the walker. The MCU 514 proceeds to determine the orientation of the walker based on the parameters sensed by the IMU. The IMU, in this embodiment is configured to sense 912 changes in orientation of the walker using multiple built-in accelerometers as well as the absolute orientation sensors.

Using the orientation measurements, the MCU 514 calculates a drive motor current proportional to the grade of slope on which the walker is standing. In particular, this component of the drive motor current is configured to counteract any torque on the associated drive motor that is induced by gravity. The component of motor current is referred to herein as the first motor current component.

In general, the first motor current component is positive when the walker is facing uphill, and negative when the walker is facing downhill. If the walker is on a grade that slopes downward in the forward direction, for example, the MCU 514 calculates 910 an electrical current sufficient to induce a drive motor torque that is substantial equal but opposite that of the torque produced by the grade (additional negative torque may be applied when the walker is going downhill to offset the effects of gravity on both the walker and the user as well as provide support for the user). The current, when used to power the associated drive motor, supplies sufficient braking force to eliminate the need for the user to have to use manual brakes to stay stead on the hill and maintain a comfortable walking pace. The current can also prevent the walker from unintentionally rolling down the hill if the user removes their hands from the walker. If the walker is on a grade that slopes to the side, for example, the MCU 514 again calculates an electrical current sufficient to induce a drive motor torque that is equal but opposite that of the torque produced by the grade in order to prevent the walker from turning down into the grade. As one skilled in the art will appreciate, the first motor current component is frequently different for the left and right drive motors.

Next, the MCU 514 determines whether or not the user is holding onto the walker at the grips. If and when the user holds the grips, the capacitive touch sensors 510 integrated into the grips transmit 916 a signal to the MCU 514 indicating contact. In the absence of contact, the MCU 514 causes to the walker to remain stationary. If user contact is detected, the MCU 514 activates 914 an automatic motor current setting. In this mode, the MCU 514 powers the drive motors based on various parameters discussed below.

In step 918, the MCU 514 applies a second motor current component based on the initial velocity of the walker. If the walker is stationary when the MCU 514 is powered on, the MCU 514 applies a second motor current component sufficient to overcome the internal friction of the wheels and motors, as well as the friction related to the normal force of the walker wheels when on a level surface. This second motor current component does not move the walker, but only prepares the walker to move with any additional current corresponding to the force applied to the walker by the user. Any additional current, when coupled with the second motor current component causes the walker to move in proportion to the additional current. In the preferred embodiment, the second motor current component is determined based on a look up table in memory or factory setting based on calibration.

If the walker is stationary when the MCU 514 is powered on, the MCU 514 calculates a second motor current component proportional to the speed, i.e., zero torque at zero velocity, to ensure smooth transitions of the wheels between forward and backward motion.

The MCU 514 then determines the sum of the first motor current component and second motor current component, and this total current is then used to energize 920 the associated motor. The total current is generally sufficient to hold the walker in place whether on level ground or a grade.

The MCU 514 in the preferred embodiment includes a closed-loop control circuit to assist in controlling the torque applied to the associated drive motor. After energizing the associated drive motor, the MCU 514 continuously monitors the actual motor current utilized by the motor. The actual current, referred to herein as the "measured current", refers to the current used by the drive motor to produce a desired torque on the wheel or a desired rotational velocity of the wheel. The measured current is measured by shunt resistors in the motor control board, one for each of the three phases drive motor (brushless direct-current motor). In contrast, the target current—the sum of the first and second motor currents—is calculated by the MCU 514 and made available to the motor driver firmware to change the voltage across each phase of the motor.

The measured current consumed by the drive motor is sometimes different than the target current used to energize the motor. The measured current and target current may differ, for example, when the walker encounters a hill which increase the load on the drive motor, or the walker encounters a dip which reduces the load on the drive motor. The actual current and desired current may also differ, for example, when the user pushes on walker (which reduces the load on the drive motor) or pulls on the walker (which increases the load on the drive motor).

The MCU 514 continuously monitors 930 the difference between the measured current and target current. In addition, the MCU 514 also continuously monitors 930 the IMU in order to determine if and when the orientation of the walker has changed. If the orientation of the walker changes while in motion, decision block 940 is answered in the affirmative and the first motor current component adjusted to reflect the change in orientation. If the grade increases, for example, the first motor current component is increased to raise the motor torque and maintain the current speed up the incline. If the grade decreases, for example, the first motor current component is decreased to maintain the current speed.

If the orientation of the walker does not change, decision block 940 is answered in the negative and the MCU 514 checks to see if the user has exerted a force on the walk, i.e., either push the walker or pull the walker. The direction and magnitude of the user force is inferred from the difference between the target current delivered to the motor and the measured current actually consumed.

If a difference between the target current and measured current is detected, decision block 950 is answered in the affirmative and the MCU 514 generates 952 a third motor current component in response to the user force applied to the walker. If the measured current is less than the target current, the MCU 514 generates a third motor current component to increase the target current and accelerate the walker. If the measured current is greater than the target current, the MCU 514 generates a third motor current component to decrease the target current and decelerate or stop the walker.

The third motor current is then added (step 920) to the first and second motor currents, and the updated total current provided to the associated drive motor.

The process of monitoring the instantaneous orientation of the walker and the current feedback from the drive motor is continuous as long as the user holds on to the grips. As such, the walker automatically adjusts the drive motor torque to compensate for the grade of the surface on which the walker is being used, thereby maintaining a constant speed. Concurrently, the user may increase or decrease the speed of the walker by merely pushing or pulling on the grips.

As stated above, the process described above is executed in parallel for each drive motor. As such, the user can execute a turn by pushing on one grip more than the other grip. To make a right turn, for example, the user can pull back on the right grip, thereby slowing down the right drive motor. Similarly, the user can push forward on the left grip to increase the speed of the left drive motor. When the turn is completed, the user need only apply the same force on the left and right grips to equalize the speed of the respective drive motors and restore a straight line of motion.

The automatic drive mode described above enables the user to effectively control the speed and direction of walker with minimal user input. In particular, the user can effectively "drive" the walker with next to no effort since the walker is configured to sense the user's desire and propel itself accordingly.

Figure 10:
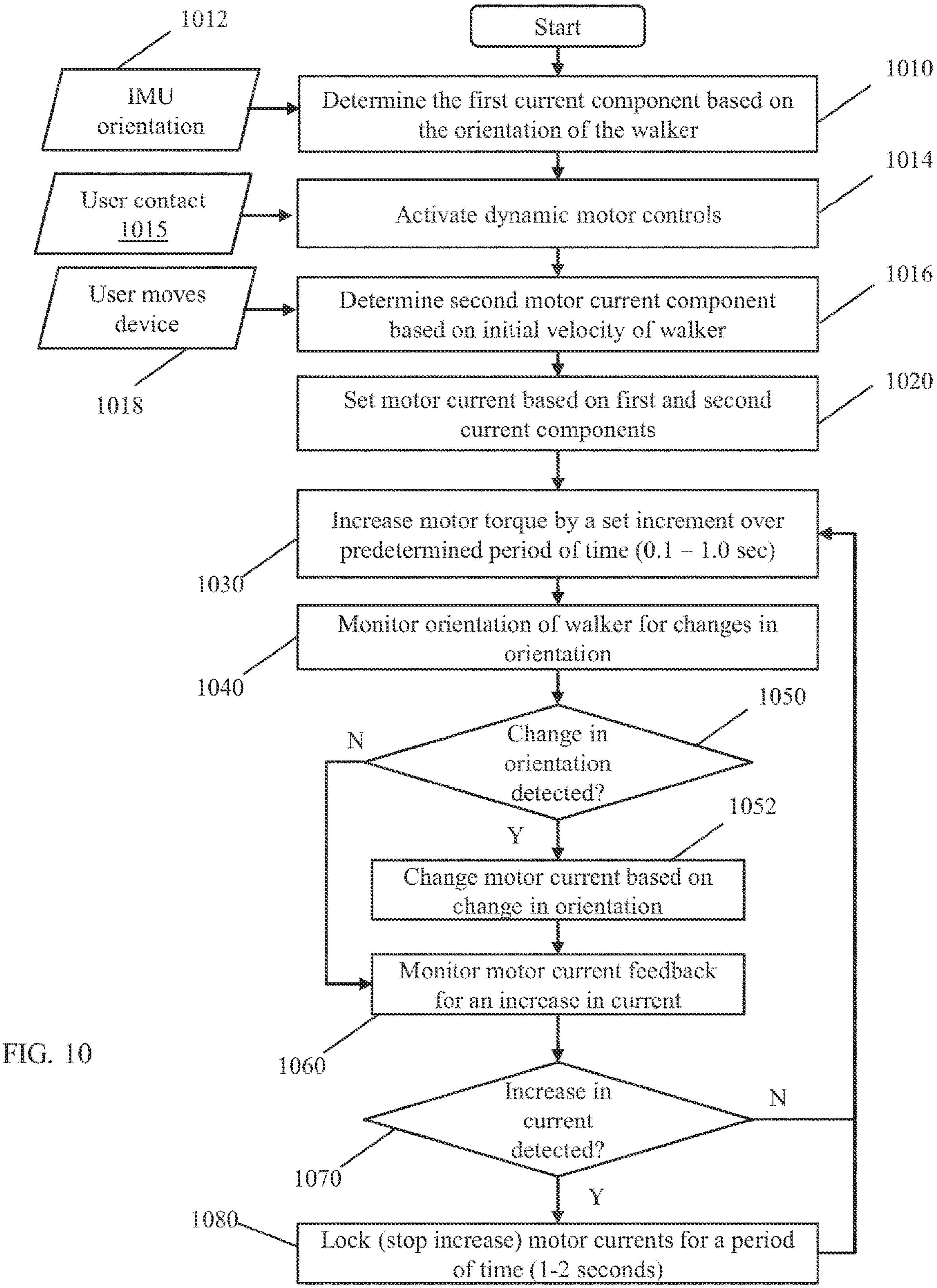
FIG. 10 is a flow chart of the process of generating motor current for a drive motor, in accordance with a second embodiment of the present invention.

Illustrated in FIG. 10 is a flow chart of the process of generating motor current for a drive motor, in accordance with a second embodiment of the present invention. This process pertains to the control of a single motor. Since the walker consists of at least two drive motors, one instance of this process is used to control the motor in a left wheel and a separate instance of the process used to control a motor in a right wheel. That is, the process is executed for two wheels independently of one another and in parallel.

Referring to FIG. 10, the user starts the process by powering on the walker. The MCU 514 proceeds to determine the orientation of the walker based on the parameters sensed by the IMU. The IMU, in this embodiment is configured to sense 1012 changes in orientation of the walker using multiple built-in accelerometers as well as the absolute orientation of the walker. Using the orientation measurements, the MCU 514 calculates a current sufficient to counteract any external torque on the associated wheel due to a gravitation force. If the walker is on a grade that slopes downward in the forward direction, for example, the MCU 514 calculates 1010 an electrical current sufficient to induce a drive motor torque that is equal but opposite that of the torque produced by the grade. The current, when used to power the associated drive motor, prevents the walker from unintentionally rolling down the hill.

Next, the MCU 514 determines whether or not the user is holding onto the walker at the grips. If and when the user holds one of the grips, the capacitive touch sensors 510 integrated into the grips transmit 1015 a signal to the MCU 514 indicating contact. In the absence of contact, the MCU 514 causes to the walker to remain stationary. If user contact is detected, the MCU 514 activates 1014 an automatic motor current setting. In this mode, the MCU 514 powers the drive motors based on various parameters discussed below.

In step 1016, the MCU 514 determine a second motor current component based on the initial velocity of walker due to the user pushing 1018 the walker, for example. The second motor current component is configured to overcome internal friction of the wheels and motors, as well as the friction related to the normal force of the walker wheels when on a level surface, without actually moving the walker forward.

The MCU 514 then energizes 1020 the associated drive motor with a current equal to the sum of the first motor current component and second motor current component. Thereafter, the MCU 514 begins to incrementally increases 1030 the motor current powering the associated motor over a predetermined period of time, preferably 0.1 to 1 second. That is, the motor current is slowly ramped up.

Concurrent with the incremental increase in current, the MCU 514 monitors 1040 the orientation of the walker every 10 milliseconds. If and when the orientation of the walker changes, decision block 1050 is answered in the affirmative and the MCU 514 adjusts the drive motor current accordingly. That is, the MCU 514 increases the current if the walker tips forward, for example, and decreases the current if the walker tips backward. The degree of current change is tailored to maintain the walker at a constant speed.

In addition to monitoring for changes in orientation, the MCU 514 monitors the current feedback from the associated drive motor. As described above, the feedback takes the form of the measured current, which is compared to the target current for purposes of determining whether the user is pulling on the walker. If and when an increase in measured current is detected, decision block 1070 is answered in the affirmative. In response, the MCU 514 infers that the user has pulled back on the walker (or the walker is now moving faster than the user) and then locks the motor current to prevent further increases as prescribed by step 1030. At this point, the speed of the walker is fixed for a predetermined period of time, preferably 1-2 seconds, assuming that the orientation of the walker remains the same.

The process of increasing the speed of the walker may resume after the completion of the 1-2 second period. Thereafter, the process returns to step 1030 to enable the MCU 514 to adjust the speed of the walker to account for changes in the grade of the ground as well as forces applied by the user.

One or more embodiments of the present invention may include a graphical processing units (GPU) configured to perform computer vision based on video from the forward-facing cameras 720 and/or user-facing cameras. The forward-facing cameras, capture image data of the path of the walker and that video analyzed by the GPU to detect on-coming hazards including curbs, steps, ledges, ridges, roots, obstacles, in front of, or to the side of, the walker, drop-offs in front of or to the side of the walker, and walls or lamp posts that are in the path of the walker. When a hazard is detected, the GPU is configured to warn the user via the haptic motors and to help the user avoid the hazard by either steering the walker away, or by applying the brakes automatically.

The user-facing cameras 520 are configured to acquire video of the user's legs, and the GPU configured either to analyze the user's gait in real-time, for example, with a computer vision model or algorithm, or to record the video and transmit it to remove servers of cloud computing for analysis. The video of the user walking and/or various metrics/parameters characterizing the gait kinematics may also be transmitted to a remote server or cloud computing system for further analysis by medical personnel.

The processes described above for generating motor current are configured to power the drive motors under normal operating conditions. Under certain conditions, however, the standard current/torque calculation above is overridden by a "state machine" control system. The state machine (SM) control system is configured, for example, to prevent the walker from accelerate more than a predetermined threshold value. The SM control system is also configured lower the target torque to zero when wheel velocity is zero or below a certain threshold (moving very slowly) and the IMU detects a sudden change in walker orientation angle. The walker may detect a sudden change in angle when, for example, the front wheels are raised to go up a curb, etc. In this situation, the drive motor torque is set to zero so the walker does not move forwards or backwards, and then is adjusted up or down based on the user interactions. If the user starts to push the device forward, torque is increased to move the walker forward. Once the user lowers the wheels back down to the surface, the SM control system returns to normal operating mode (i.e., the MCU 514 returns to adjusting the motor drive current based on the measured orientation of the walker).

When a wheel loses contact with the ground due to an uneven surface, for example, the lack of friction on the wheel could cause the wheel to start spinning too fast. To prevent this, the SM control system immediately sets the drive motor torque to zero when a wheel acceleration that exceeds a pre-determined threshold is detected.

The SM control system may also be configured to prevent the user from losing control over the walker. When the user's feet are observed to be stationary, but the walker is still moving, the state machine control system can set the drive motor velocity to completely stop the walker from rolling away.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer, processor, electronic circuit, or module capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid-state memory chips, for example. The term processor as used herein refers to a number of processing devices including electronic circuits such as personal computing devices, servers, general purpose computers, special purpose computers, application-specific integrated circuit (ASIC), and digital/analog circuits with discrete components, for example.

One or more embodiments of the present invention may be implemented with one or more wireless networking technologies that can communicate either with other electronic devices or to servers on a wireless network.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A walker with automated power drive, the walker comprising:

a rigid frame comprising a left grip and a right grip;

a plurality of wheels affixed to the rigid frame;

a plurality of drive motors integrally mounted in the plurality of wheels; and a drive motor controller configured to power the plurality of drive motors, wherein the controller is configured to:

a) determine an orientation of the walker, b) generate a first motor current component based on the orientation of the walker;

c) determine a speed of the walker;

d) generate a second motor current component based on the speed of the walker, e) determine a user force applied to the left grip and right grip; wherein the user force applied to the left grip and right grip is determined based on a difference between a target current provided to the drive motors and a measured current from the drive motors;

f) generate a third motor current component for each of the plurality of drive motors based on the user force applied to the left grip and right grip; and g) power each of the plurality of drive motors based on a sum of the first motor current component, second motor current component, and third motor current component.

2. The walker of claim 1, wherein the drive motor controller determines an orientation of the walker based on an inertial measurement unit.

3. The walker of claim 2, wherein the drive motor controller determines a speed of the walker based on the inertial measurement unit or rotational speed of the drive motors.

4. The walker of claim 1, wherein the rigid frame is configured to fold, and the walker further comprises one or more actuators configured to fold and unfold in response to user input.

5. The walker of claim 1, further comprising a remote health monitor configured to:

acquire one or more metrics characterizing the user's gait; and network communication interface configured to transmit the one or more metrics to a remote server.

6. The walker of claim 1, wherein the remote health monitor is further configured atoll to:

acquire a heart rate and blood oxygen level of the user; and transmit the user heart rate and blood oxygen level to the remote server.

7. A walker with automated power drive, the walker comprising:

a rigid frame comprising a left grip and a right grip;

a left wheel and right wheel affixed to the rigid frame;

a left drive motor integrally mounted to the left wheel;

a right drive motor integrally mounted to the right wheel; and a drive motor controller for powering the left drive motor and right drive motor, wherein the controller is configured to:

a) determine an orientation of the walker, a speed of the walker, and a user force applied to the left grip and to the right grip;

b) generate a first motor current component based on the orientation of the walker;

c) generate a second motor current component based on the speed of the walker;

d) determine a user force applied forwards or backwards on the left grip and right grip; wherein the user force applied to the left grip is determined based on a difference between a target current used to power the left drive motor and a measured current from the left drive motor, and the user force applied to the right grip is determined based on a difference between a target current used to power the right drive motor and a measured current from the right drive motor;

e) generate a third motor current component associated with the left drive motor based on the user force applied forwards or backwards on the left grip;

f) generate a third motor current component associated with the right drive motor based on the user force applied forwards or backwards on the right grip;

g) power the left drive motor with a drive current equal to a sum of the first motor current component, second motor current component, and third motor current component associated with the left drive motor; and h) power the right drive motor with a drive current equal to a sum of the first motor current component, second motor current component, and third motor current component associated with the right drive motor.

8. A walker with automated power drive, the walker comprising:

a rigid frame comprising a left grip and a right grip;

a left wheel and right wheel affixed to the rigid frame;

a left drive motor integrally mounted to the left wheel;

a right drive motor integrally mounted to the right wheel; and a drive motor controller for powering the left drive motor and right drive motor, wherein the controller is configured to:

a) determine an orientation of the walker and a speed of the walker;

b) generate a first motor current component based on the orientation of the walker;

c) generate a second motor current component based on the speed of the walker;

d) generate a third motor current component for the left drive motor;

e) generate a third motor current component for the right drive motor;

f) power the left drive motor with a drive current equal to a sum of the first motor current component, second motor current component, and third motor current component associated with the left drive motor; and g) power the right drive motor with a drive current equal to a sum of the first motor current component, second motor current component, and third motor current component associated with the right drive motor h) wherein the third motor current component associated with the left drive motor increases over a predetermined period of time until a user force is detected at the left drive motor; and i) wherein the third motor current component associated with the right drive motor increases over a predetermined period of time until a user force is detected at the right drive motor.

* * * * *